United States Patent [19]
Montesissa

[11] Patent Number: 5,339,999
[45] Date of Patent: Aug. 23, 1994

[54] EASY CLEANING METERING DEVICE

[75] Inventor: Giancarlo Montesissa, Robbio, Italy

[73] Assignee: Nestec S.A., Vevey, Switzerland

[21] Appl. No.: 717,276

[22] Filed: Jun. 18, 1991

[30] Foreign Application Priority Data

Jul. 7, 1990 [EP] European Pat. Off. ......... 90113010.4

[51] Int. Cl.⁵ .............................................. B67D 5/37
[52] U.S. Cl. .................................... 222/380; 222/148; 222/496
[58] Field of Search ............... 222/148, 309, 380, 383, 222/372, 375, 496, 497, 571

[56] References Cited

U.S. PATENT DOCUMENTS

| 3,349,973 | 10/1967 | Smith | 222/168.5 X |
| 3,865,281 | 2/1975 | Byrd et al. | 222/309 X |
| 4,410,108 | 10/1983 | Minard | 222/380 |
| 4,676,279 | 6/1987 | von Lersner | 222/148 X |
| 4,708,269 | 11/1987 | Willerding | 222/148 X |
| 4,842,026 | 6/1989 | Nordmeyer et al. | 222/148 X |
| 4,974,754 | 12/1990 | Wirz | 222/309 X |
| 5,108,014 | 4/1992 | Nordmeyer et al. | 222/380 |

FOREIGN PATENT DOCUMENTS

| 2163097 | 7/1973 | Fed. Rep. of Germany | 222/380 |
| 3317608 | 12/1984 | Fed. Rep. of Germany | |
| 2392252 | 12/1978 | France | |
| 2455269 | 11/1980 | France | |
| 604134 | 8/1978 | Switzerland | |
| 1520346 | 11/1989 | U.S.S.R. | 222/380 |
| 2156911A | 10/1985 | United Kingdom | |

Primary Examiner—Kevin F. Shaver
Attorney, Agent, or Firm—Vogt & O'Donnell

[57] ABSTRACT

A metering device includes a valve body defining a chamber extending longitudinally between an inlet and an outlet and an intake valve having an opening extending into the chamber adjacent the inlet and a metering valve having an opening extending into the chamber between the intake valve and the outlet. A tube is connected to the chamber outlet, and a reciprocable piston closure is positioned for sealing the chamber from the tube. An intake piston is positioned within the intake valve and reciprocates in operation to draw product into the chamber in a retracted position and to seal the chamber inlet in an extended position. A metering piston is positioned within the metering valve and reciprocates in operation to draw product into the chamber in a retracted position and to expel product from the chamber by forcing product to open the flap in an extended position.

5 Claims, 3 Drawing Sheets

EASY CLEANING METERING DEVICE

This invention relates to a metering unit, more particularly to a metering unit for filling cups with a paste-form product, fitted to a packaging machine operated stepwise.

A metering unit of the type in question comprises a metering chamber connected upstream to a feed hopper and downstream to a pouring nozzle and means for drawing the product under suction into the chamber and for removing the product towards the pouring nozzle.

A known metering unit for paste-form products, particularly processed cheese, according to Swiss Patent 604 134 for example comprises a metering piston which draws the product under suction into the cylinder of the piston, which forms the metering chamber, and delivers it to a pouring nozzle by way of a rotary casing of which the passage has a lateral opening communicating successively with the feed system and with the pouring nozzle and an axial opening permanently communicating with the cylinder. At the end of a production cycle, the unit in question has to be dismantled, freed from residues of product and placed in a water-jet washing machine for cleaning. Finally, the component parts are placed in a bowl of disinfectant solution and then reassembled the following day. Apart from their cost and the loss of time, these operations give rise to wear of the parts subjected to repeated dismantling and reassembly.

Another metering unit described in French Patent 2,392,252, which relates to the metering of liquid food products, comprises a cyclindrical chamber in which two coaxial pistons, of which one is a control and blocking piston and the other a metering piston actuated independently of one another, move one behind the other in the cylinder, the rod of the control and blocking piston passing through the hollow rod of the metering piston. To rinse the unit without dismantling, the two pistons can be withdrawn into an upper part of larger diameter of the cylinder to allow cleaning liquids and sterilising steam to enter. This known unit may be satisfactory in the case of liquid products. However, for viscous or even sticky products, such as processed cheese for example, it has certain disadvantages.

In particular:
- The product enters the cylinder upwards through a lateral opening which is opened/closed by the blocking piston sliding on the inner surface of the cylinder. Filling of the chamber is more difficult than downward filling. In addition, intake openings of this type, i.e. formed in a curved surface, wear the seals out very quickly.
- Because the end of the blocking piston also acts as a discharge valve, there is an intermediate phase between the intake and delivery phases in which the piston discharges a residue of product situated in its seating. As a result, droplets of product can form.
- Careful cleaning and sterilization of the component parts of the unit was difficult, particularly at the seals fitted to the head of the metering piston either on the cylinder side or on the piston rod side of the blocking piston.
- In addition, the cleaning and sanitizing fluids follow different paths from the product to be metered, which necessitates separate cleaning spaces and separate cleaning and sanitizing circuits. In addition, during the cleaning and sanitizing phases, the blocking and metering pistons are stationary.

The object of the present invention is to improve metering units of the type described above so that they could be used for paste-form products under extremely hygienic, near-sterile conditions and could be cleaned and sanitized in a closed circuit without any need for dismantling.

SUMMARY OF THE INVENTION

The metering unit according to the invention is characterized in that it comprises a piston intake valve of which the body opens into the chamber immediately below the hopper, a metering piston of which the body opens into the chamber between the valve body and the pouring nozzle and a delivery flap between the metering chamber and the pouring nozzle and in that the metering chamber is inclined downwards in the direction of the pouring nozzle.

The invention also relates to a process for cleaning and sanitizing a metering unit intended to operate under highly hygienic, near-sterile conditions, more particularly for filling containers with a paste-form product, without the metering unit having to be dismantled, comprising a metering chamber connected upstream to a feed hopper and downstream to a pouring nozzle and equipped with means for drawing the product under suction into the chamber and for removing the product towards the pouring nozzle, characterized in that the cleaning and sanitizing fluids follow the same path as the product and the means for drawing in and removing the product are in motion throughout the operation.

The invention will be better understood from the accompanying drawings which, illustrate one embodiment of the metering unit.

DETAILED DESCRIPTION OF THE DRAWINGS

Figure 1:
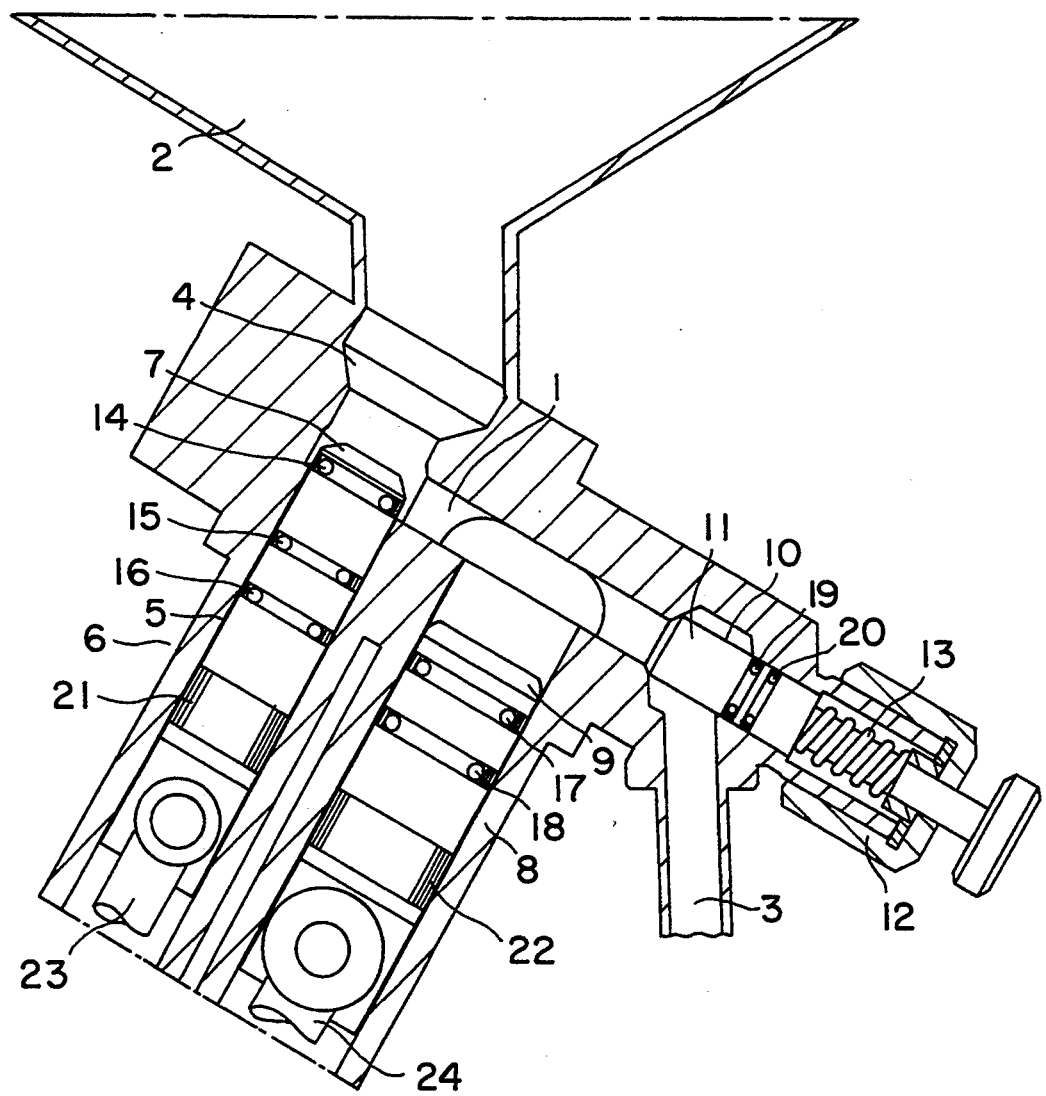
FIG. 1 is a central longitudinal section through the metering unit showing the intake of the product into the metering chamber in the production phase.

Referring to FIG. 1, the metering chamber 1 which extends longitudinally between an inlet and an outlet and which is connected upstream to the hopper 2 and downstream to the pouring nozzle 26 (FIG. 6) by the tube 3. The metering chamber is inclined downwards in the direction of the pouring nozzle by the tube 3. The hopper opens into the chamber 1 through the frustoconical opening 4 situated in alignment with the body 5 of the piston intake valve 6 (the piston being denoted by the reference numeral 7). The body 8 of the metering piston 9 opens into the chamber 1 between the intake valve 6 and the tube 3. The piston flap 10 (the piston being denoted by the reference numeral 11) is able to close the metering chamber 1 towards the pouring nozzle, the tightening collar 12 serving to regulate the tension of the spring 13 by which the flap 10 is closed during the intake phase. Fluid-tightness between the metering chamber and the pistons 7, 9 and 11 while they are moving is established by annular seals 15,16,17,18,19 and 20. The seal 14 establishes fluid-tightness between the chamber 1 and the feed hopper 2. These seals offer high resistance to wear, to chemical cleaning agents and to heat and are sterilizable. They are impervious to steam at high temperature. The rings 21 and 22 guide the pistons in the axial direction to limit the wear of the seals.

The rods 23 and 24 are connected either to levers (not shown) actuated by the drive means of a packaging machine or to independently controlled pneumatic jacks (not shown), as will be explained hereinafter.

The operation of the metering unit comprises successive sanitizing, production and cleaning phases. During the sanitizing and cleaning phases, the pistons are disconnected from the drive means of the packaging machine and connected to the independent pneumatic device which subjects them to a slow alternating movement.

Figure 6:
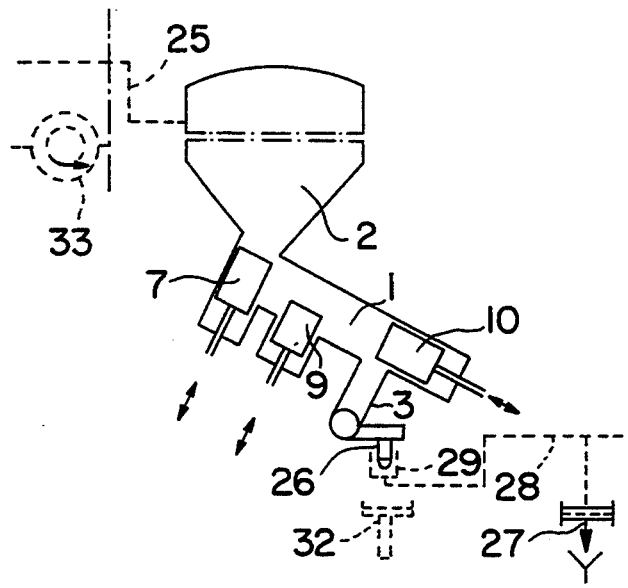
FIG. 6 is a general diagram of the sanitizing and cleaning circuit.

During the production phase, the pneumatic device is disconnected from the pistons which are then reconnected to the drive motor of the packaging machine to establish synchronization between metering and packaging of the product and rapid alternating movement, the production rate being much higher than that prevailing during the sanitizing and cleaning phases. To sanitize the metering unit, as shown in FIG. 6, steam is introduced through the pipe 25 into the hopper 2. The hopper is in fact a sealed tank capable of being placed under pressure. The steam floods the metering chamber 1, heats and sterilizes the heads of the intake piston 7, the metering piston 9 and the flap 10 and then escapes through the tube 3 by way of the pouring nozzle 26 towards the purger 27. The pouring nozzle 26 is connected to the purger 27 by the return circuit by means of the cap 29.

Figure 3:
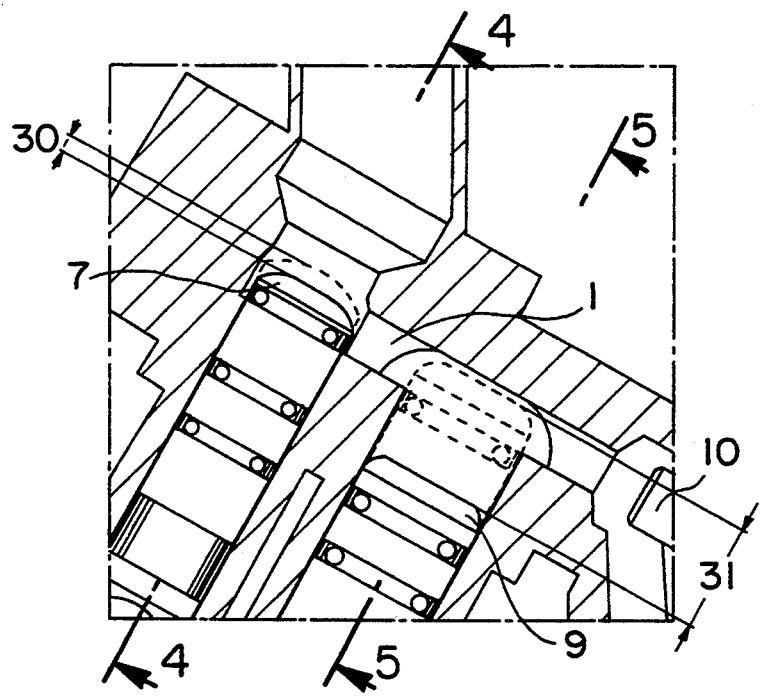
FIG. 3 is a partial central longitudinal section on the line 3—3 of FIGS. 4 and 5 of a variant of the metering unit during the cleaning and sanitizing phases.
Figure 4:
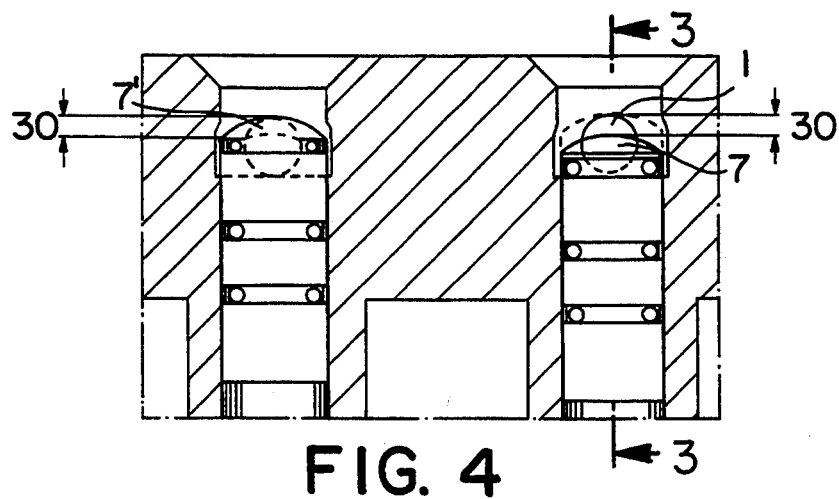
FIG. 4 is a partial section on the line 4—4 of FIG. 3.
Figure 5:
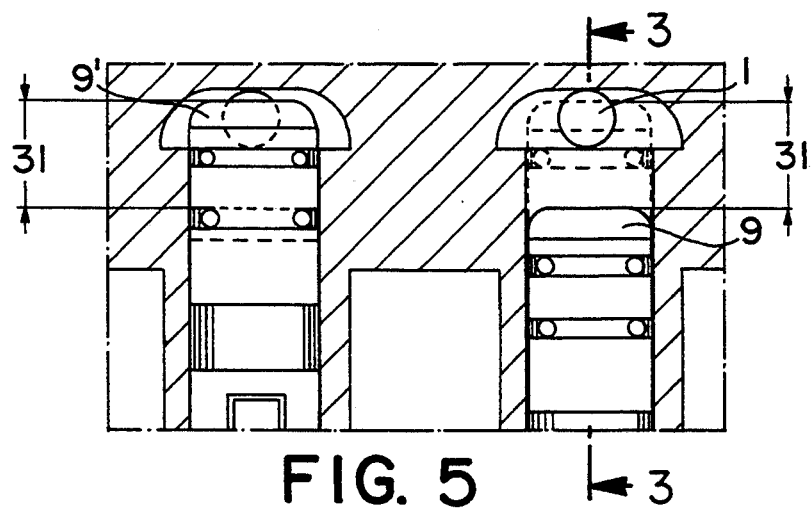
FIG. 5 is a partial section on the line 5—5 of FIG. 3.

As shown in FIG. 3, the flap 10 is completely opened by adjustable means for applying and releasing tension on the reciprocable piston closure, e.g., by unscrewing the tightening collar until the spring 13 is no longer under tension. In FIGS. 3, 4 and 5, the metering unit comprises two parallel metering chambers which open onto two pouring nozzles.

The piston 7 makes an alternating movement of low amplitude, 30, between its lower dead center position (solid line) and its upper dead center position (dotted line). The piston 9 makes an alternating movement of high amplitude, 31, between its lower dead center position (solid line) and its upper dead center position (dotted line). The movements of the intake piston 7 and the metering piston 9 associated with one of the chambers are opposite to the movements of the intake piston 7' and the metering piston 9' associated with the other chamber. Thus when the pistons 7 and 9 are in their lower position in the first chamber, the corresponding pistons 7' and 9' in the second chamber are in their upper position. By virtue of the inclination of the metering chamber, any water of condensation formed after passage of the steam does not collect, but instead flows out of the metering unit, thus avoiding a lack of sterility due to the presence of condensation.

Figure 2:
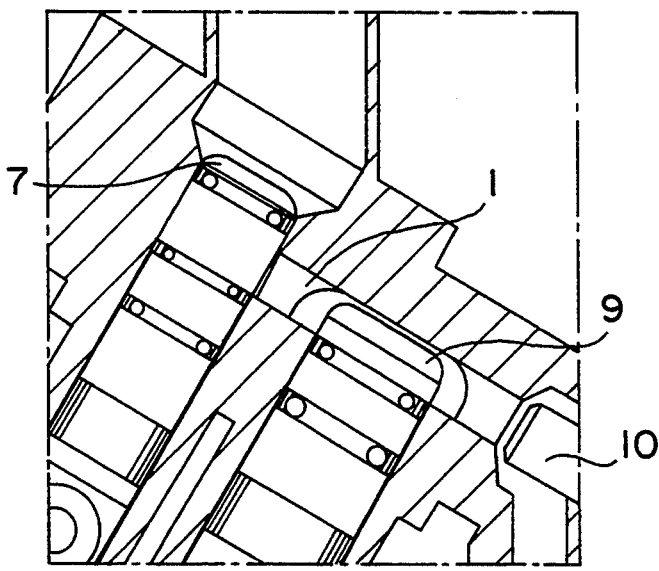
FIG. 2 is a partial central longitudinal section through the metering unit showing the metering of the product towards the pouring nozzle in the production phase.

In the following production phase, the intake and metering pistons are connected to the drive motor of the packaging machine. The pouring nozzle is separated from the cap 29 and the flap 10 is closed by placing the spring 13 under tension by tightening the collar 12. The product arriving through the pipe 25 is taken in from the hopper 2 towards the chamber 1 when the intake piston 7 descends to its lower dead center position and the piston 9 descends immediately afterwards to its lower dead center position (both positions are shown in FIG. 1). The piston 7 ascends first to its upper dead center position shown in FIG. 2, after which the piston 9 ascends in turn to its upper dead center position shown in FIG. 2. During this phase, the piston 7 stops the inflow of product and the piston 9 sends a portion of product through the tube 3 to the pouring nozzle, pushing the flap 10 back through the pressure applied. In a preferred variant comprising two metering chambers and two pouring nozzles, the movements of the pistons are parallel so that two cups 32 are filled at the same time.

On completion of the production phase, the metering unit is cleaned. To this end, the pouring nozzle 26 is turned through approximately 90' about a horizontal axis towards the rear (this position has not been shown), the flap 10 is opened and the tube 3 is connected to the line 28. The cleaning fluids are passed through the metering unit by means of the relay pump 33 by way of the pipe 25 and the hopper 2 and are then removed through the pipe 28.

The pistons 7 and 9, previously disconnected from the drive mechanism of the packaging machine, are reconnected to the independent displacement mechanism. These movements of the pistons 7 and 9 are the same as described above in connection with the sanitizing phase. In FIGS. 3, 4 and 5, the stroke of the intake piston 7 is much shorter than that of the metering piston 9. In the upper position, the piston 7 leaves the passage between the hopper and the chamber partly open. So far as the piston 9 is concerned, the amplitude of its movement is greater than during the production phase. By virtue of their position and their alternating movement, the heads of the pistons 7 and 9 are completely washed by the cleaning fluids, as is that part of the piston bodies 5 and 8 which is in contact with the product up to the seals 15 and 17. Similarly, the piston 11 and the body of the flap 10 in contact with the product are accessible to the cleaning fluids up to the seal 19. The flap 10 is kept open by unscrewing the tightening collar 12. Referring to FIGS. 4 and 5, it can be seen that the movements of the pistons 7 and 9 associated with one of the chambers are opposite to the movements of the pistons 7' and 9' associated with the other chamber. This arrangement has the advantage of ensuring the passage of the fluids at a continuous inflow rate and a progressive outflow rate alternately to one pouring nozzle and then the other.

In the embodiment described above, the alternate movements of the valve and metering pistons associated with one chamber take place in the same direction in the sanitizing and cleaning phases. They could also take place in opposite directions with no disadvantage.

A metering unit comprising one or two metering chambers has been described in the foregoing. A metering unit according to the invention could of course comprise more than two chambers connected to the feed hopper, each opening onto a pouring nozzle. In this case, the movements of the intake valve and the metering piston associated with each of the chambers during the cleaning and sanitizing phases would preferably be synchronized to ensure the passage of the fluids from a continuous feed alternately to the various pouring nozzles without the formation of preferential flows.

In the foregoing description, reference was made to independent pneumatic control means for the intake and metering pistons during the sanitizing and cleaning phases. These pistons could also be actuated by mechanical means, for example guided cams or eccentrics acting on levers. A spring-loaded closure flap has also been shown. The flap could also be pneumatically or mechanically actuated in synchronism with the intake and metering pistons by the same displacement mechanism.

Although the metering unit is specially adapted for the metering of cheese paste, it may of course also be used for metering portions of other paste-form and even sticky food products, such as fruit pastes, chocolate paste, confectionery pastes, cereal pastes, purees, or even paste-form products other than foods. It is particularly advantageous for metering paste-form products which have to be-handled under highly hygienic, near-sterile conditions. Through the conformation without any dead angles of the metering chamber and the rounded shapes of the piston heads, all those parts which are in contact with the product are readily accessible to the cleaning and sanitizing fluids. A major advantage of the metering unit according to the invention is that all those moving parts which are in contact with the product are in motion during the sanitizing and cleaning phases. According to the invention, these operations may be carried out with the packaging machine stopped by means of an independent drive mechanism. In addition to minimizing wear and energy consumption, the stoppage of the packaging machine during these phases enables the materials for packaging the portions, such as, for example, the shaping belts for cups and tear strips for easy opening of the portions of processed cheese, to be left in place. This provides for a considerable saving of time when production is resumed.

I claim:

1. A metering device comprising:
   a body defining an interior wall portion which extends longitudinally to define a chamber which extends to a chamber end opening in the body, product inlet and product outlet portions, each having an opening into the chamber at a position displaced longitudinally one from another, an intake valve portion having an opening into the chamber at a position which opposes the product inlet opening, a metering valve portion having an opening into the chamber at a position between the intake valve opening and the product outlet opening, an a tube portion which extends from the product outlet opening;
   a reciprocative chamber and product outlet closure piston configured and positioned within the interior wall portion for closing the chamber end opening, for sealing the product outlet opening and for being moved in a direction away from the product outlet opening and towards the chamber end to open the product outlet opening and then reciprocating to seal the product outlet opening;
   a reciprocative intake valve portion piston positioned within the intake valve portion and configured for, upon reciprocation in a direction towards and then away from the product inlet opening, extending through the intake valve opening to the product inlet opening for sealing the product inlet opening from the chamber and then opening the product inlet opening for drawing product into the chamber; and
   a reciprocative metering valve portion piston positioned within the metering valve portion and configured for, upon movement in a direction away from the chamber, for drawing product into the chamber and for, when the product inlet opening is sealed and upon movement towards the chamber, extending through the metering valve opening and forcing product in the chamber to move the chamber wall closure piston to open the product outlet opening to expel the product from the chamber through the product outlet opening.

2. A metering device according to claim 1 further comprising a pouring nozzle connected to the tube portion at a position displaced away from the chamber outlet portion.

3. A metering device according to claim 1 wherein the closure piston comprises means for adjustably applying and releasing tension on the closure piston.

4. A metering device according to claim 1 further comprising a product feed hopper connected to the chamber inlet portion.

5. A metering device according to claim 6 wherein the hopper is affixed to the inlet portion so that, in a position for operation, the chamber is inclined downwardly from the from the product inlet opening to the product outlet opening.

* * * * *

UNITED STATES PATENT AND TRADEMARK OFFICE
CERTIFICATE OF CORRECTION

PATENT NO. : 5,339,999
DATED : August 23, 1994
INVENTOR(S) : Giancarlo MONTESISSA It is certified that error appears in the above-indentified patent and that said Letters Patent is hereby corrected as shown below:

Column 1, between lines 2-3, insert --BACKGROUND OF THE INVENTION--.

Column 1, line 4, delete "This" and insert therefor --The present--.

Column 1, line 55, after "Fig. 1," insert --a valve body defines--.

Column 5, line 41 (line 2 of claim 1), after "a", insert --device--.

Column 6, line 44 (line 1 of claim 5), "6" should be --4--.

Signed and Sealed this

Eighth Day of November, 1994

Attest:

BRUCE LEHMAN

Attesting Officer     Commissioner of Patents and Trademarks